United States Patent [19]

Blazo et al.

[11] Patent Number: 4,791,589

[45] Date of Patent: Dec. 13, 1988

[54] PROCESSING CIRCUIT FOR CAPTURING EVENT IN DIGITAL CAMERA SYSTEM

[75] Inventors: Stephen F. Blazo, Portland; Gail W. Marshall, Beaverton, both of Oreg.

[73] Assignee: Tektronix, Inc., Beaverton, Oreg.

[21] Appl. No.: 925,354

[22] Filed: Oct. 31, 1986

[51] Int. Cl.⁴ .......................... G06F 3/05; G06F 3/18
[52] U.S. Cl. ..................................... 364/518; 364/487; 324/77 R
[58] Field of Search ............... 364/518, 523, 484, 485, 364/486, 487; 324/77 R, 78 R; 355/39; 358/101, 10, 106, 183; 382/5

[56] References Cited

U.S. PATENT DOCUMENTS

| 4,148,061 | 4/1979 | Lemelson | 358/101 |
| 4,525,859 | 6/1985 | Bowles et al. | 382/5 |
| 4,660,086 | 4/1987 | Lemelson | 358/183 |
| 4,666,271 | 5/1987 | Gonsot | 352/90 |
| 4,672,437 | 6/1987 | Casper | 358/101 |

Primary Examiner—Gary V. Harkcom
Assistant Examiner—Randy W. Lacasse
Attorney, Agent, or Firm—William O. Geny; Francis I. Gray

[57] ABSTRACT

A processing circuit for a digital camera system enables capture of a visual event which falls within some user-defined range. A digital camera converts a target image into a set of digital data signals, each signal representing the brightness level of a pixel in a matrix. A memory stores a mask also comprising a matrix of pixels. As the digital camera scans the target image, each data pixel from the camera is compared to a corresponding pixel in the mask and differences in brightness between the two are counted. When the count reaches some predetermined valve, the current frame of video data is saved for further analysis and/or display.

10 Claims, 1 Drawing Sheet

PROCESSING CIRCUIT FOR CAPTURING EVENT IN DIGITAL CAMERA SYSTEM

BACKGROUND OF THE INVENTION

The following invention relates to a processing circuit for use in a digital camera system which allows a visual event to be captured in a memory whenever that event falls outside the range of a user-defined visual image.

Electronic test instruments such as oscilloscopes display visual waveforms on a CRT screen or other visual medium to provide a visual depiction of activity within a device under test. It is sometimes desirable with such instruments to have photographic records of the waveforms resulting from certain tests displayed on the oscilloscope. Heretofore, cameras have been developed which are adapted to be clipped or mounted to the front of the oscilloscope for taking pictures of visual events displayed on the CRT screen. Such cameras have not, however, been capable of digital signal processing.

A desirable feature in such cameras would be the ability to selectively capture certain visual events that fit a predetermined event characteristic. For example, if as a result of certain tests, a certain waveform is expected to be displayed on the oscilloscope, it may be desirable to have a photographic record of any waveform displayed that deviates from the expected waveform by some predetermined amount. This feature has been available in digital oscilloscopes as shown in Dagostino et al. U.S. Pat. No. 4,510,571, but has not been available in cameras adapted for photographing oscilloscope traces.

SUMMARY OF THE INVENTION

The present invention is a processing circuit for a digital camera system which enables capture of a visual event which falls within some user-defined range. The processing circuit includes a digital camera for converting a target visual image into a set of digital data signals, and a memory for storing a mask which comprises another set of digital signals representing a predetermined visual image. A comparator in the processing circuit compares the data signals with the digital signals representing the mask and provides an output indication whenever the data signals vary with respect to the mask by some predetermined amount.

The output indication may trigger the capture of the set of data signals that produced the output indication. This may be accomplished by saving the signals in a memory for later display by a personal computer and associated CRT, or the signals may be converted to a photographic image.

The digital camera system scans the visual image presented by the oscilloscope at a predetermined frame repetition rate. There are any number of optical systems which may be used. The digital camera may include a charge-coupled device which, as it is scanned, provides an output signal from an array or matrix of pixels representing the brightness of each of the pixels in the array. This signal may be converted to a digital signal in which each digital word represents the brightness level of one of the pixels in the matrix. The mask includes a matrix of pixels, also represented by bytes of data in which each byte or digital word represents the brightness level of one of the pixels in the matrix.

Each byte of data representing a pixel is examined serially in a threshold detector to determine whether it is "lit" (above threshold) or "unlit" (below threshold). The output of the threshold detector is a status bit. The bytes defining the pixel matrix in the mask are also examined for brightness level and a corresponding status bit is derived for each one. A logic circuit compares the status bits of each and determines whether a camera pixel is lit when the corresponding mask pixel is unlit. Each time this occurs, the logic circuit provides an output pulse to a counter circuit. When a predetermined number of pulses have been counted within a frame, an indication is provided to a host central processing unit, or other output device, which indicates that the visual event appearing on the oscilloscope varies from the user-defined mask and should be saved for further analysis.

A principal object of this invention is to provide a digital camera system having a processing circuit for saving visual events that differ from a predetermined user-defined mask by a predetermined amount.

The foregoing and other objectives, features and advantages of the present invention will be more readily understood upon consideration of the following detailed description of the invention taken in conjunction with the accompanying drawings.

DETAILED DESCRIPTION OF THE INVENTION

Figure 1:
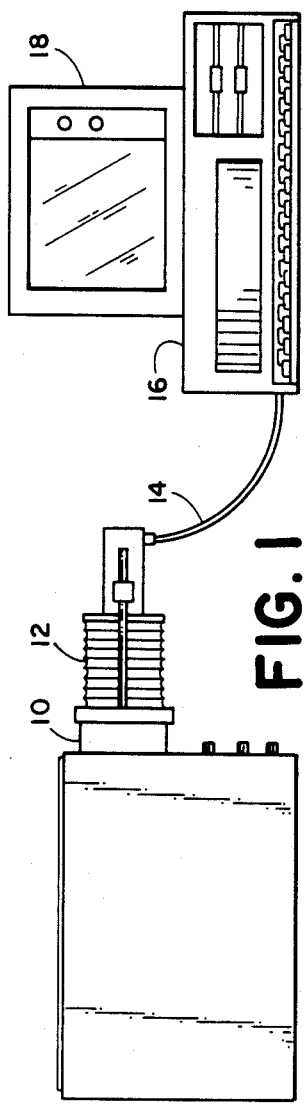
FIG. 1 is a perspective view of a digital camera system connected to an oscilloscope.

A visual image of a waveform is provided on the CRT screen (not shown) of an oscilloscope 10. A digital camera 12 is mounted to the face of the oscilloscope 10 so as to cover the CRT screen so that it may capture light from the CRT and convert it to digital signals. The digital signals may be provided by a cable 14 to a computer 16 which may be a conventional personal computer having a display screen 18.

Figure 2:
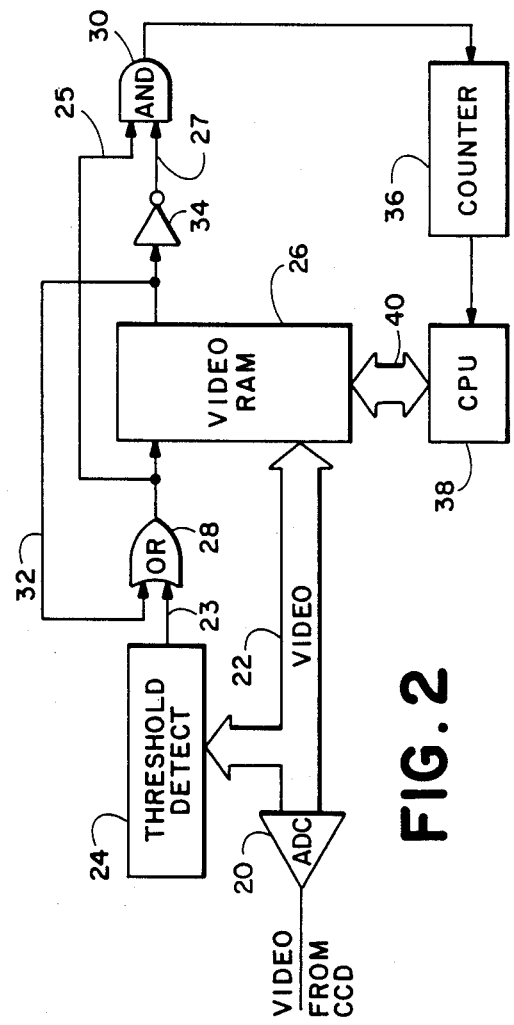
FIG. 2 is a block schematic diagram of the processing circuit of the invention included in the digital camera system of FIG. 1.

Referring to FIG. 2, a video signal from a charge coupled device (CCD) (not shown) located in camera 12 appears as an input to analog to digital converter 20. The CCD in camera 12 provides a video output signal which varies in intensity as each pixel in the CCD is scanned. The scanning occurs at some predetermined frame repetition rate, and, therefore, once per frame each pixel in the CCD will generate a video signal whose intensity is a function of the luminance of that pixel at that particular point in time. The analog to digital converter 20 converts these video signals to digital data signals which represent, in digital form, the visual image scanned by the CCD. This data is provided by way of video bus 22 to a threshold detector 24 and to video ram 26. The output of the threshold detector 24 is connected to an input of OR gate 28. The output of OR gate 28 is coupled to video ram 26 and to an input to AND gate 30. An output of the video ram 26 is connected to a feedback line 32 which is coupled to another input to OR gate 28. This output is also connected to an inverting amplifier 34, and the output of the inverting amplifier 34 forms the second input to AND gate 30. The output of AND gate 30 is coupled to the input of a counter 36, and the output of counter 36 is connected to a central processing unit 38. The central processing unit 38 is, in turn, connected in two-way communication with video ram 26 by bus 40.

In operation, a user programs the central processing unit 38 to create a visual mask represented by a matrix of user-defined pixels. These may be represented by digital words which are provided over the bus 40 to the video ram 26 where the mask is stored in memory. Alternatively, if desired, the mask may be created by visual images captured by the camera 12 over several frames and converted to digital signals by the analog to digital converter 20. In this way the mask may comprise a visual history of activity appearing on the screen. These signals are then provided to the video ram 26 over video bus 22.

Each byte of data at the output of analog-to-digital converter 20 represents a level of brightness or the "gray code" of each pixel. As each data byte is provided to threshold detector 24, it is examined and a logic output signal is provided indicating whether the pixel is lit (above a predetermined threshold) or unlit (below threshold). If the pixel is lit, the output of threshold detector 24 is high, and if unlit, the output is low. This signal forms the first input 23 to OR gate 28. The second input to OR gate 28 comes from line 32 which is connected to the portion of video ram 26 where the mask is stored. Each of the bytes representing pixels in the mask may include a status bit, and it is this status bit which is provided on line 32 to the other input of OR gate 28. The status bit provided on line 32 will be for the pixel in the mask that has the same position in the matrix as the pixel currently being examined by the threshold detector 24. Thus, if either the output of threshold detector 24 or the corresponding pixel in the mask is high, indicating a lit pixel, the output of OR gate 28 will be high. This output is provided as a first input 25 to AND gate 30. The second input 27 to AND gate 30 is an inversion of the status bit on line 32 and is the output of inverting amplifier 34. The output of AND gate 30 will be high, if and only if, threshold detector 24 detects a lit pixel and the corresponding pixel in the mask stored in video ram 26 is unlit. When this occurs, the counter 36 counts a high logic output pulse from AND gate 30. When a predetermined number of such output pulses have been counted, an indication is provided to the central processing unit 38 to save the image stored in video ram 26. The video image remains stored in the ram 26 for one frame and is then provided to the CPU 38 over bus 40. The counter 36 is reset after each frame.

Thus, each byte representing the brightness of each camera pixel is compared in serial fashion with the corresponding byte representing a pixel existing in a mask and a determination is made as to whether the camera pixel is lit during a frame where the mask pixel remains dark. In such a case a counter is toggled and at a predetermined count, that frame of data is saved for further analysis or display by the computer 16. If the mask, for example, comprises a sine wave, waveforms which differ from that sine wave by predetermined amounts will then be detected and saved in memory for later analysis or display.

The terms and expressions which have been employed in the foregoing specification are used therein as terms of description and not of limitation, and there is no intention, in the use of such terms and expressions, of excluding equivalents of the features shown and described or portions thereof, it being recognized that the scope of the invention is defined and limited only by the claims which follow.

What is claimed is:

1. A processing circuit in a digital camera adapted to be coupled to a visual display screen and providing a video output representing a photographic image, comprising:
    (a) analog-to-digital converter means associated with said digital camera for converting said video output into video digital signals;
    (b) video memory means for storing a mask comprising a set of digital signals representing a predetermined visual image;
    (c) comparator means for comparing said video digital signals with said mask and for providing an indication when said video digital signals vary with respect to said mask by a predetermined amount; and
    (d) means for storing said video digital signals in a memory when said indication is provided by said comparator means.

2. The processing circuit of claim 1 wherein said video digital signals comprise a matrix of pixels, said matrix being generated by said digital camera once per frame of data, each pixel being represented by a digital word, and including a threshold detector for examining each pixel and for providing a status bit indicating whether each pixel is lit or unlit.

3. The processing circuit of claim 2 wherein said comparator means comprises logic circuit means for comparing each of said status bits with corresponding status bits derived from said mask, and for providing an output pulse whenever a pixel from said matrix is lit and the corresponding pixel from said mask is unlit.

4. The processing circuit of claim 3 wherein said comparator means further comprises counter means for counting said output pulses and for providing said indication upon counting a predetermined number of said pulses within a predetermined time period.

5. The processing circuit of claim 4 wherein said video digital words are processed serially by said comparator and said predetermined time period comprises the time required for said camera to complete a frame of data.

6. A digital camera for converting visual images to a digital signal, comprising:
    (a) means for capturing a visual event and for converting said event to an electrical signal at a predetermined frame repetition rate;
    (b) analog-to-digital converter means for converting said electrical signal to a digital representation comprising a data matrix of pixels, each pixel in said data matrix being represented by a digital word;
    (c) memory means for storing a mask comprising a matrix of user defined pixels; and
    (d) means for comparing each pixel in said data matrix with each corresponding pixel in said user-defined matrix, and for providing an output indication when said data matrix varies from said user defined matrix by a predetermined amount.

7. The digital camera of claim 6 wherein said means for comparing comprises detector means for determining whether each pixel in said data matrix is lit or unlit and for providing a status bit of a first logic state when said pixel is lit and of a second logic state when said pixel is unlit.

8. The digital camera of claim 7 wherein said means for comparing further comprises logic circuit means for determining whether each of said status bits differs from a corresponding status bit derived from said user defined matrix and for providing an output pulse whenever the status bit from said data matrix is in said first logic state and said status bit from said user defined matrix is in a logic state indicative of an unlit pixel.

9. The digital camera of claim 8 further including counter means for counting the number of said output pulses provided by said logic circuit means once per frame and for generating said output indication when a predetermined number of output pulses per frame have been counted.

10. The digital camera of claim 9 further including means for saving in memory a frame of data pixels when an output indication is generated during said frame.

* * * * *